3,353,912
PREPARATION OF HIGH-PURITY MATERIALS
Norman G. Ainslie, Mahopac, N.Y., assignor to International Business Machines Corporation, New York, N.Y., a corporation of New York
Filed Mar. 20, 1962, Ser. No. 180,970
18 Claims. (Cl. 23—204)

This invention relates to techniques for preparing high-purity materials and, in particular, to techniques for reducing silicon contamination in materials that are prepared in fused silica vessels.

When materials are prepared in fused silica vessels at temperatures in excess of 1000° C., the silica tends to dissociate, liberating free silicon which contaminates the materials. Among the useful materials that are conventionally prepared in fused silica vessels are many of the semiconductor materials including those comprised of a group III element and a group V element, as defined in the periodic chart of the elements. Gallium arsenide (GaAs), gallium phosphide (GaP) and indium phosphide (InP) are known to be particularly useful III–V semiconductor compounds.

If crystals of these compounds are melt grown in fused silica vessels, they are contaminated by the silica dissociation and their electrical properties are adversely affected. In particular, the electron mobility of the resulting material is lowered. High electron mobility materials are useful for high speed semiconductor devices because, for a given device geometry and carrier density, the electrical resistance is correspondingly small. Furthermore, the factors that give rise to high majority carrier mobility also result in high minority carrier mobility which is an important determinant of device speed. For example, the limiting frequency at which a transistor can be operated is increased as the minority carrier mobility, and hence the transit time across the base region is increased.

The adverse effect of silicon contamination has been experimentally overcome by synthesizing the melt in a vessel made of a material such as aluminum nitride. However, consistent high quality aluminum nitride vessels are not readily available and are considerably more expensive than fused silica vessels. The present invention provides techniques for suppressing the silicon contamination to permit the preparation of high purity materials in conventional readily available and inexpensive fused silica vessels.

In accordance with the invention, the dissociation of silica is suppressed by preparing the material in an oxygen or oxide atmosphere. The invention will be particularly exemplified with respect to the preparation of a semiconductor material, gallium arsenide, in an oxygen or oxide atmosphere. Since the invention provides suppression of silica dissociation when materials are synthesized in fused silica vessels to permit the preparation of relatively uncontaminated materials, the material being synthesized plays a passive role.

With respect to the preparation of gallium arsenide, it is believed that, when an oxygen or oxide atmosphere is present during synthesis, the oxygen combines with gallium to form a gallous oxide ($Ga_2O$) atomsphere. This reaction can be stimulated by placing oxygen in the reaction tube or by the use of a metallic oxide which is unstable at the temperature of the furnace and liberates its oxygen which, in turn, combines with gallium to form gallous oxide.

The undesirable silica dissociation reaction that occurs when a fused silica ($SiO_2$) vessel contacts a gallium or gallium arsenide melt can be represented by $$4Ga + SiO_2 \rightarrow 2Ga_2O + Si$$

Therefore, the presence of excess gallous oxide ($Ga_2O$) in the gas phase suppresses this reaction and prevents contamination by silicon.

The use of an oxide atmosphere to suppress the level of silicon contamination permits the preparation of high-purity materials, including high-purity semiconductor materials having high mobilities, in conventional fused silica vessels.

An object of the present invention is to provide techniques for preparing high-purity materials.

A further object is to provide techniques for preparing high-purity materials in fused silica vessels.

Another object is to provide techniques for preparing high-purity semiconductor materials in fused silica vessels.

A further object is to provide techniques for preparing high-mobility semiconductor materials comprising group III–V compounds in fused silica vessels.

Another object is to provide techniques for preparing high-mobility gallium arsenide in fused silica vessels.

A further object is to provide techniques for preparing high-mobility semiconductor materials by the use of an oxide atmosphere during synthesis.

A still further object is to provide techniques for preparing high-mobility gallium arsenide by the use of a gallous oxide atmosphere during synthesis.

Another object is to provide techniques for preparing high-mobility gallium arsenide by the addition of oxygen to form a gallous oxide atmosphere during synthesis.

A further object is to provide techniques for preparing high-mobility gallium arsenide by the use of a metallic oxide which liberates oxygen to form a gallous oxide atmosphere during synthesis.

Another object is to provide techniques for preparing high-mobility gallium arsenide by the use of a gallic oxide which liberates oxygen to form a gallous oxide atmosphere during synthesis.

The foregoing and other objects, features and advantages of the invention will be apparent from the following more particular description of preferred embodiments of the invention as illustrated in the accompanying drawings.

In accordance with the invention, high-purity materials may be prepared in fused silica vessels with a reduced silicon contamination by the use of an oxide atmosphere.

Figure 1:
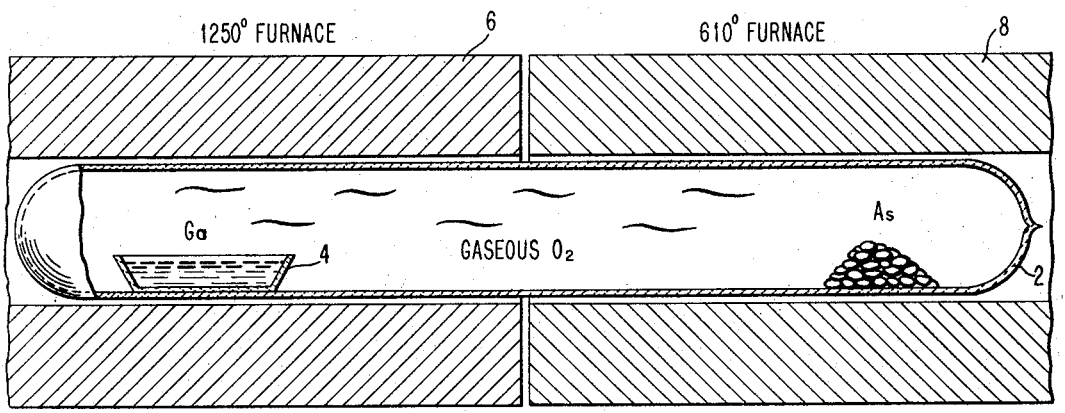
FIGURE 1 is a cross-sectional diagram illustrating a first technique for preparing high-purity gallium arsenide.

FIGURE 1 illustrates a first example of the preparation of high-purity materials in a fused silica vessel. In this example, a sealed reaction tube 2 containing gallium in a fused silica vessel 4 at one end and a quantity of arsenic at the other end is evacuated to a pressure of approximately $10^{-6}$ mm. of mercury and oxygen is added at a room temperature pressure of approximately 5–20 mm. of mercury. Conventional techniques for evacuating the reaction tube and adding oxygen may be employed. The reaction tube is then sealed and placed in a double furnace such that the gallium is located at the center of one furnace 6 at a temperature of approximately 1250° C. (above the melting temperature of gallium arsenide) and the arsenic is located at the center of another furnace 8 at a temperature of approximately 610° C. (approximately the sublimation temperature of arsenic). The sublimed arsenic vapor traverses the reaction tube and combines with the gallium to form gallium arsenide in the vessel. The oxygen in the reaction tube suppresses the dissociation of silica at the vessel walls. After the process has stabilized (approximately 30 minutes) and the melt synthesized, the vessel 4 is gradually cooled by either reducing the temperature of the furnace 6 or by slowly removing the reaction tube 2 resulting in crystal formation. The crystal growing technique that has been described is a form of the well-known horizontal Bridgman technique.

The amount of oxygen that is added is not critical and high mobility is obtained with initial (room temperature) oxygen pressures between 1 and 100 mm. of mercury. However, to obtain high mobility with low resistivity, pressures under 20 mm. of mercury are used.

Figure 2:
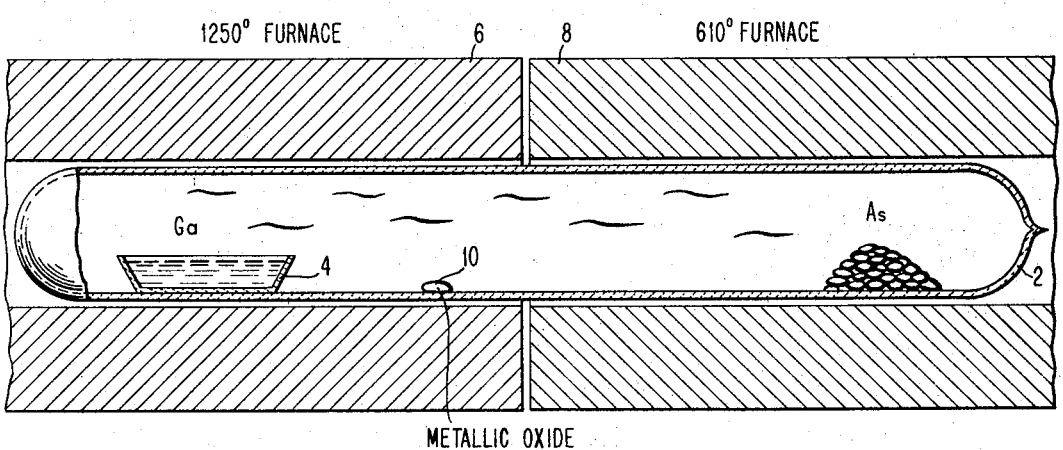
FIGURE 2 is a cross-sectional diagram illustrating a second technique for preparing high-purity gallium arsenide.

FIGURE 2 illustrates a second example of the invention, where high-purity materials are prepared in an oxide atmosphere resulting from the liberation of oxygen from a metallic oxide 10 located in the reaction tube 2. Many metallic oxides can in principle be used, the chief criteria being that at a given temperature, the metallic oxide is unstable (liberates oxygen) and both it and its metal component are non-volatile. These criteria are met by placing the metallic oxides at the correct temperature location in the reaction tube. For example, gallic oxide ($Ga_2O_3$) can be used and should be placed in the high temperature end of the container to liberate a sufficient amount of oxygen. In this example, since the gallium in the gallic oxide will not contaminate the melt, the gallic oxide may be placed in the vessel. In this example, 32 mg. of gallic oxide in a container having an inside diameter of one inch and a length of 23 inches provides oxygen which, if liberated at room temperature, would be at a pressure of approximately 17 mm. of mercury. This is defined as a 17 mm. of mercury "room temperature" pressure. (During synthesis the oxide atmosphere is at a significantly higher pressure due to heating in the closed reaction tube.) The amount of metallic oxide is not critical because it controls the oxygen pressure which may be varied over a fairly wide range as has been described.

Figure 3:
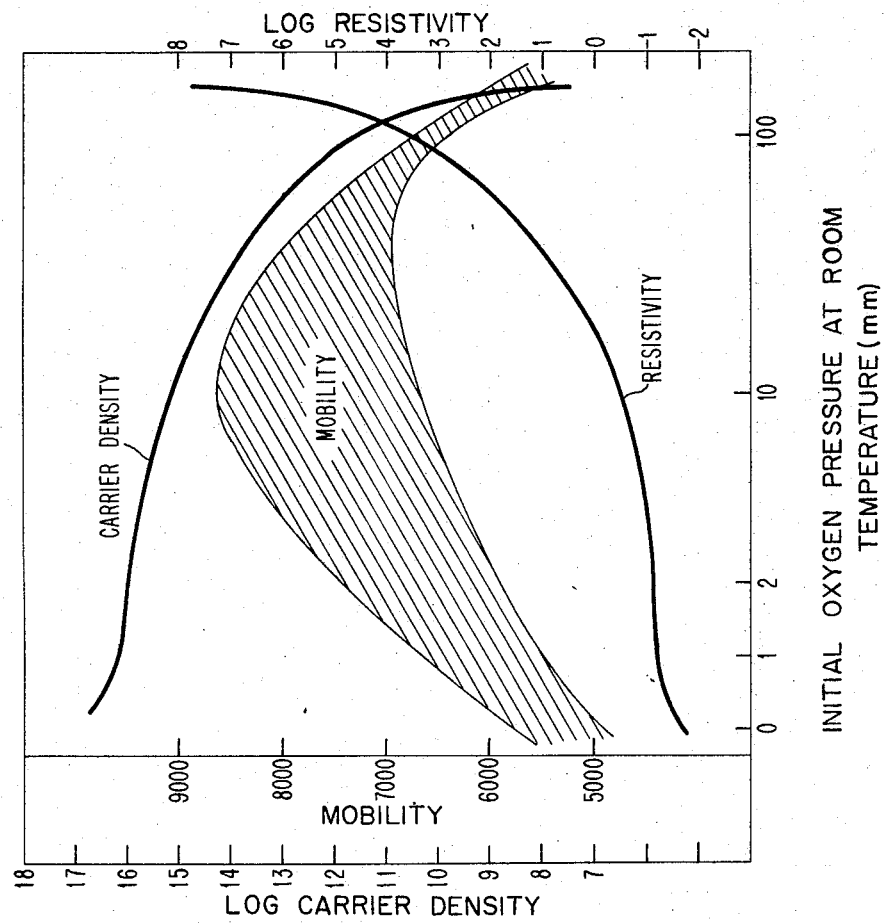
FIGURE 3 is a graph showing the relationship between carrier density, electron mobility and resistivity as a function of room temperature oxygen pressures.

The enhanced purity and, hence, mobility of gallium arsenide produced by the above techniques is shown in FIGURE 3. Resistivity and carrier density are plotted as single line curves because their scatter bands are relatively small with respect to the coordinates used. Mobility is shown by a shaded area to reflect the range of mobilities obtained. It should be noted in accordance with the invention, that relatively high mobilities are obtained using room temperature oxygen pressures below 100 mm. of mercury. Furthermore, it should be specifically noted, with room temperature oxygen pressures below 20 mm. of mercury, extremely high mobilities along with low resistivities are obtained.

Figure 4:
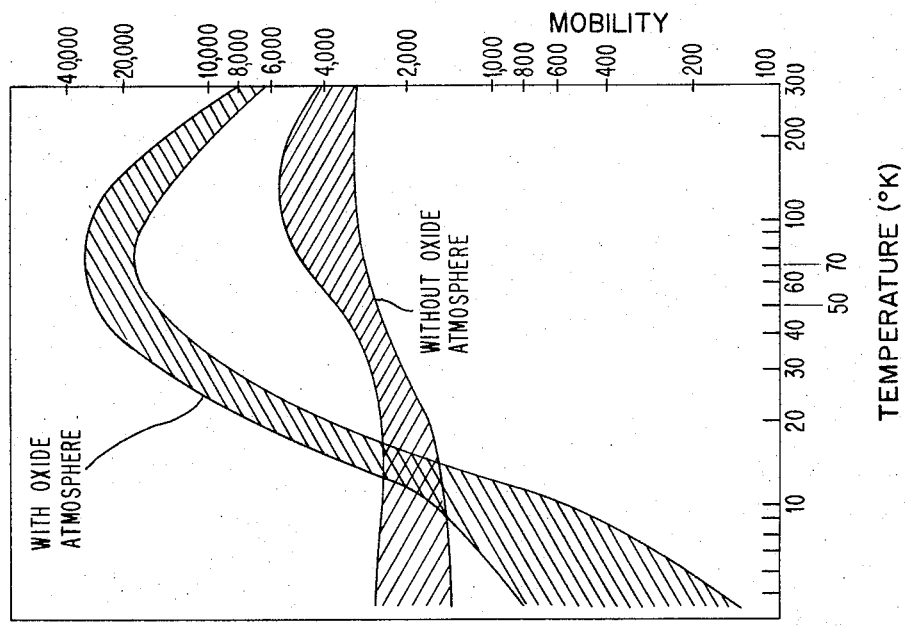
FIGURE 4 is a graph showing electron mobility as a function of temperature for gallium arsenide synthesized with an oxide atmosphere and synthesized without an oxide atmosphere.

Gallium arsenide produced in fused silica vessels in an oxide atmosphere have mobilities that are considerably higher than the mobilities achieved with materials produced in fused silica vessels without this atmosphere. This is shown in FIGURE 4 for a room temperature oxygen pressure of approximately 10 mm. of mercury. The maximum mobilities that are generally obtained with materials produced without the oxide atmosphere are 5000–6000 at a temperature of about 150° K., whereas the materials produced in accordance with the invention with the oxide atmosphere have mobilities that are considerably higher than this even at room temperature (300° K.). With decreasing temperature the mobility of the material produced under the oxide atmosphere increases very sharply to a maximum of 20,000–30,000 at approximately 70° K. At temperatures below 20° K., electrons are transported through impurity conduction bands in which the mobility increases with increasing impurity content. As a result the conventional material shown, being considerably less pure than that prepared in the oxide atmosphere, has higher mobility at these very low temperatures.

In accordance with the invention, the addition of oxygen or a metallic oxide to form an oxide atmosphere while producing materials in fused silica vessels has been shown to provide high purity materials.

When these processes are used in the preparation of certain semiconductor materials, such as gallium arsenide, materials with superior electrical properties are obtained.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of preparing a gallium arsenide crystal with a high mobility in a fused silica vessel located in a reaction tube comprising the steps of:
    placing gallium in the fused silica vessel in a first portion of the reaction tube;
    placing arsenic in a second portion of the reaction tube;
    evacuating the reaction tube;
    inserting oxygen into the reaction tube with a room-temperature pressure below 100 mm. of mercury to suppress silicon contamination of the melt;
    heating the first portion of the reaction tube to a temperature above the melting point of gallium arsenide and simultaneously heating the second portion of the reaction tube to a temperature above the sublimation point of arsenic, to synthesize a gallium arsenide melt in the vessel;
    and subsequently cooling the melt in the vessel to form the high-mobility gallium arsenide crystal.

2. The method described in claim 1, wherein said room-temperature pressure is further limited to below 20 mm. of mercury.

3. The method of preparing a gallium arsenide crystal with a high mobility in a fused silica vessel located in a reaction tube comprising the steps of:
    placing gallium in the fused silica vessel in a first portion of the reaction tube;
    placing arsenic in a second portion of the reaction tube;
    evacuating the reaction tube;
    inserting oxygen into the reaction tube with a room-temperature pressure below 100 mm. of mercury to suppress silicon contamination of the melt;
    heating the first portion of the reaction tube to a temperature of approximately 1250° C. and simultaneously heating the second portion of the reaction tube to a temperature of approximately 610° C. to synthesize a gallium arsenide melt in the vessel;
    and subsequently cooling the melt in the vessel to form the high-mobility gallium arsenide crystal.

4. The method described in claim 3, wherein said room-temperature pressure is further limited to below 20 mm. of mercury.

5. The method of preparing a gallium arsenide crystal with a high mobility in a fused silica vessel located in a reaction tube comprising the steps of:
placing gallium in the fused silica vessel in a first portion of the reaction tube;
placing arsenic in a second portion of the reaction tube;
placing a quantity of gallic oxide in the first portion of the reaction tube, where the quantity is selected such that oxygen with a room-temperature pressure below 100 mm. of mercury is liberated when heated to a temperature of approximately 1250° C. to suppress silicon contamination of the melt;
evacuating the reaction tube;
heating the first portion of the reaction tube to a temperature of approximately 1250° C. and simultaneously heating the second portion of the reaction tube to a temperature of approximately 610° C. to synthesize a gallium arsenide melt in the vessel;
and subsequently cooling the melt in the vessel to form the high mobility crystal.

6. The method described in claim 5, wherein said room-temperature pressure is further limited to below 20 mm. of mercury.

7. A method for producing a group III–V semiconductor crystal with high mobility in which a group III element disposed in a fused silica vessel at one portion of an evacuated reaction tube is reacted with a group V element disposed at another portion of said reaction tube at a temperature above the melting point of said group III–V semiconductor to produce a melt thereof the steps of:
introducing an atmosphere within said reaction tube in which oxygen is present at a room temperature pressure below 100 mm. of mercury to suppress silicon contamination during the formation of said crystal from the melt;
and gradually cooling the melt to form the high mobility crystal.

8. The method described in claim 7, wherein said room-temperature pressure is further limited to below 20 mm. of mercury.

9. The method of preparing a group III–V semiconductor crystal with a high mobility in a fused silica vessel located in a reaction tube comprising the steps of:
placing a group III element in the fused silica vessel in a first portion of the reaction tube;
placing a group V element in a second portion of the reaction tube;
evacuating the reaction tube;
inserting oxygen into the reaction tube with a room temperature pressure below 100 mm. of mercury to suppress silicon contamination in said crystal;
heating the first portion of the reaction tube to a temperature above the melting point of said group III–V semiconductor and simultaneously heating the second portion of the reaction tube to a temperature above the vaporization point of said group V element to synthesize a group III–V melt in the vessel;
and subsequently cooling the melt in the vessel to form the high-mobility group III–V crystal.

10. The method described in claim 9, wherein said room-temperature pressure is further limited to below 20 mm. of mercury.

11. The method of preparing a group III–V semiconductor crystal with a high mobility in a fused silica vessel located in a reaction tube comprising the steps of:
placing a group III element in the fused silica vessel in a first portion of the reaction tube;
placing a group V element in a second portion of the reaction tube;
placing a quantity of metallic oxide in the first portion of the reaction tube where the quantity is selected such that oxygen with a room temperature pressure below 100 mm. of mercury is liberated at the synthesis temperature of a melt of said group III–V semiconductor;
evacuating the reaction tube;
heating the first portion of the reaction tube to a temperature above the melting point of said group III–V semiconductor and simultaneously heating the second portion of the reaction tube to a temperature above the vaporization point of said group V element to synthesize a group III–V melt in the vessel;
and subsequently cooling the melt in the vessel to form the high mobility group III–V crystal.

12. The method described in claim 11, wherein said room-temperature pressure is further limited to below 20 mm. of mercury.

13. A method for producing a gallium arsenide semiconductor crystal with high mobility in which gallium disposed in a fused silica vessel at one portion of an evacuated reaction tube is reacted with arsenic disposed at another portion of said reaction tube at a temperature above the melting point of said gallium arsenide to produce a melt thereof the steps of:
introducing an atmosphere within said reaction tube in which oxygen is present at a room temperature pressure below 100 mm. of mercury to suppress silicon contamination during the formation of said gallium arsenide crystal from the melt;
gradually cooling the melt to form the high mobility gallium arsenide crystal.

14. The method described in claim 13, wherein said room-temperature pressure is further limited to below 20 mm. of mercury.

15. A method for producing a gallium arsenide semiconductor crystal with high mobility in which gallium disposed in a fused silica vessel at one portion of an evacuated reaction tube is reacted with arsenic disposed at another portion of said reaction tube at a temperature above the melting point of said gallium arsenide to produce a melt thereof the steps of:
introducing a gallous oxide atmosphere within said reaction tube in which oxygen is present at a room temperature pressure below 100 mm. of mercury to suppress silicon contamination during the formation of said gallium arsenide crystal from the melt;
gradually cooling the melt to form the high mobility gallium arsenide crystal.

16. The method described in claim 15, wherein said room-temperature pressure is further limited to below 20 mm. of mercury.

17. The method of preparing a gallium arsenide crystal with a high mobility in a fused silica vessel located in a reaction tube comprising the steps of:
placing gallium in the fused silica vessel in a first portion of the reaction tube;
placing arsenic in a second portion of the reaction tube;
placing a quantity of metallic oxide in the first portion of the reaction tube, where the quantity is selected such that oxygen with a room temperature pressure below 100 mm. of mercury is liberated at the synthesis temperature of a melt of gallium arsenide to suppress silicon contamination of the melt;
evacuating the reaction tube;
heating the first portion of the reaction tube to a temperature above the melting point of gallium arsenide and simultaneously heating the second portion of the reaction tube to a temperature above the sublimation point of arsenic to synthesize a gallium arsenide melt in the vessel and subsequently cooling the melt in the vessel to form the high mobility gallium arsenide crystal.

18. The method described in claim 17, wherein said room-temperature pressure is further limited to below 20 mm. of mercury.

References Cited

UNITED STATES PATENTS 2,921,905   1/1960   Hung-Chi Chang   252—62.3

OTHER REFERENCES

Chemical and Engineering News, vol. 38, p. 72, Apr. 18, 1960, Vapor Reaction Makes Gallium Phosphide, Bell Scientists React Phosphorus, Gallium Suboxide to Grow Whiskers of GaP.

Hilsum et al.: Semiconducting Group III–V Compounds, Pergamon Press, New York, 1961, pp. 77–79 and 108.

Mellor: A Comprehensive Treatise on Inorganic and Theoretical Chemistry, vol. 5, Longmans Green Co., London, 1924, p. 380.

Weisberg et al.: "Materials Research on GaAs etc.," Properties of Elemental and Compound Semiconductors, ed. by H. C. Gatos, Interscience Publ., 1960, pp. 49, 50, 58.

MILTON WEISSMAN, *Primary Examiner.*

BENJAMIN HENKIN, OSCAR R. VERTIZ,
*Examiners.*

R. D. EDMONDS, H. S. MILLER, *Assistant Examiners.*